US000001449H

United States Statutory Invention Registration [19]

[11] Reg. Number: H1449

Miles

[43] Published: Jun. 6, 1995

[54] THERMAL BATTERY CELLS CONTAINING NOVEL CATHODE MATERIALS IN AN OXYANIONIC ELECTROLYTE

[75] Inventor: Melvin H. Miles, Ridgecrest, Calif.

[73] Assignee: The United States of America as represented by the Secretary of the Navy, Washington, D.C.

[21] Appl. No.: 563,131

[22] Filed: Aug. 6, 1990

[51] Int. Cl.[6] ..... H01M 6/36

[52] U.S. Cl. ..... 429/112; 429/199; 429/225

[58] Field of Search ..... 429/102, 103, 112, 105, 429/108, 199, 218, 222, 225, 227, 202, 207

[56] References Cited

U.S. PATENT DOCUMENTS

| | | | |
|---|---|---|---|
| 4,260,667 | 4/1981 | Miles et al. | 429/112 |
| 4,416,958 | 11/1983 | Miles et al. | 429/103 |
| 4,528,253 | 7/1985 | McManis, III et al. | 429/112 |
| 4,535,037 | 8/1985 | McManis, III et al. | 429/112 |
| 4,668,594 | 5/1987 | Yamaura et al. | 429/194 |

OTHER PUBLICATIONS

M. H. Miles, et al., "*Problems Associated with the Electrochemical Reduction of Metal Ions in $LiNO_3$—$KNO_3$ and $LiClO_4$—$KClO_4$ Melts*", vol. 134, No. 3, Mar. 1987, pp. 614–620.

M. H. Miles, et al., "*Cyclic Voltammetric Studies of Nitrato Complexes of Various Metal Ions in Molten Li-$No_3$+$KNO_3$ at 180° C.*", J. Electroanal. Chem., vol. 221 (1987) pp. 115–128.

*Primary Examiner*—Peter A. Nelson

*Attorney, Agent, or Firm*—Melvin J. Sliwka; Stuart H. Nissim; Donald E. Lincoln

[57] ABSTRACT

The addition of cathode materials comprising In+++, Pb++ or Cd++ ion, e.g. in the form of salts such as $In(NO_3)_3$, $Pb(NO_3)_2$, $Cd(NO_3)_2$ or the corresponding perchlorates, to oxyanionic electrolyte cells increases cell potential. Such cathodic materials are added to lower melting fused salt oxyanionic electrolytes such as nitrate or perchlorate electrolytes, e.g. $LiNO_3$, $KNO_3$ or $LiCl0_4$, in a concentration sufficient to increase cell potential, using Li or Ca anodes. A suitable metal current collector such as a Ni screen can be used as a cathode. The above cathodic materials can be used in conjunction with other cathodic materials such as $AgNO_3$, which undergoes reduction to the free metal.

19 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

THERMAL BATTERY CELLS CONTAINING NOVEL CATHODE MATERIALS IN AN OXYANIONIC ELECTROLYTE

The invention described herein may be manufactured and used by or for the government of the United States of America for governmental purposes without the payment of any royalties thereon or therefor.

BACKGROUND OF THE INVENTION

1. Field of the Invention

This invention relates to the field of electrochemistry, and more particularly relates to thermally activated electrochemical cells having an oxyanionic electrolyte containing novel cathode materials, resulting in an increase in cell potential.

2. Description of the Prior Art

Thermally activated electrochemical cells or batteries have been used quite extensively in military applications, such as a power source for arming devices, because of their long shelf life and compactness, and capability of withstanding shock and vibration. Batteries of this type typically include an electrolyte which, under normal storage condictions, is solid and does not conduct electricity. When the battery and/or the electrolyte is heated to a predetermined temperature, as by igniting a built-in pyrotechnic heat source such as an electric match, squib or percussion primer, the electrolyte, upon changing to a molten state, becomes conductive and ionically connects the electrodes to provide the desired electromotive force.

Nitrate salts have been proposed for use in thermal batteries because of their low melting points. See U.S. Pat. No. 4,260,667 to Miles and Fletcher. For example, potassium nitrate-lithium nitrate ($KNO_3$-$LiNO_3$) mixtures melt at temperatures as low as 124° C. The use of a lower melting electrolyte can shorten a battery's activation time and reduce the weight of heat sources and insulation.

A particular problem area of thermal cells using oxidizing molten salts such as molten nitrates or molten perchlorates as cathode materials is the slow kinetics for the reduction of the oxyanion. For example:

$$NO_3^- + 2e^- \rightarrow NO_2 + 0^=$$

$$ClO_4^- + 2e^- \rightarrow ClO_3 + 0^=$$

The large overpotentials for the reduction of these oxyanions results in significant lowering of cell potentials at moderate current densities. Consequently, silver salts have been added to the electrolytes as cathode materials to improve cell potentials. These silver salts involve the reduction of the metal ions to the free metal in reversible electrode reactions, such as:

$$AgNO_3 + e - \rightleftharpoons Ag + NO_3^-$$

However, the added silver salts migrate and diffuse to the anode and form metal films on the anode surface that interfere with cell operation.

U.S. Pat. No. 4,416,958 to Miles and Fletcher discloses a thermally activated electrochemical cell having a low melting point electrolyte. The electrolyte is composed of a layer of a mixture of lithium perchlorate and lithium nitrate adjacent the anode and of a layer of a mixture of lithium perchlorate, lithium nitrate, and silver nitrate adjacent the cathode of the cell.

The article titled "Problems Associated with the Electochemical Reduction of Metal Ions in $LiNO_3$-$KNO_3$ and $LiClO_4$-$KClO_4$ Melts" by M. H Miles et al, Journal of the Electrochem. Society, Vol. 134, No. 3, March, 1987, pages 614 to 620, discloses electrochemical studies of certain ions including $Cd^{++}$, $Pb^{++}$ and $In^{+++}$ in molten $LiNO_3$-$KNO_3$, showing the effect of the addition of such ions to the molten nitrate electrolyte.

The article "Cyclic Voltammetric Studies of Nitrato Complexes of Various Metal Ions in Molten $LiNO_3$+-$KNO_3$ at 180° C., by M. H. Miles et al, J. Electoanal Chem., 221 (1987) 115–128, discloses addition of various metal ions including $Pb^{++}$ and $Cd^{++}$ and other ions such as $Co^{++}$ and $Cu^{++}$ to molten nitrates, and the effect of such additions.

However, neither of the above articles discloses or teaches the application of the principles or concepts that are disclosed in the above articles to thermal batteries, particularly employing lithium or calcium anodes.

One object of the invention accordingly is the provision of an improved thermal electrochemical cell.

Another object is to provide a novel thermal electrochemical cell utilizing low melting electrolytes.

A still further object is the provision of improved thermal electrochemical cells incorporating certain cathode materials in the electrolyte.

Yet another object is to provide thermal electrochemical cells having an oxyanionic electrolyte and containing certain metal salts as cathodic material, to increase the potential of the cell.

SUMMARY OF THE INVENTION

According to the present invention, it has now been found that addition of certain metal ions in the form of salts to oxyanionic electolyte melts such as nitrates in an electrochemical cell containing a lithium or calcium anode, when activated by heating, produces cathodic currents at potentials significantly more positive than the reversible potential for the metal ion/metal reaction, as in the case of silver salts, as noted above, thereby producing greater cell potentials than previously achieved.

The increase in cell potential is accomplished employing a cathode comprising $In^{+++}$, $Pb^{++}$ or $Cd^{++}$ ions as the cathode material and a lower melting fused salt electrolyte. Such ions are added in the form of a suitable salt such as $In(NO_3)_3$, $Pb(NO_3)_2$, $Cd(NO_3)_2$ or $Pb(ClO_4)_2$, to a lower melting fused salt electrolyte such as $LiNO_3$, $KNO_3$, or mixtures thereof. This cathode material/low melting electrolyte combination is necessary because of the high melting points of the above additives used as cathode materials. The cathode materials can be added directly to the fused salt electrolyte at various concentrations, as noted hereinafter.

DETAILED DESCRIPTION OF THE INVENTION AND PREFERRED EMBODIMENTS

The cathode material comprising the $In^{+++}$, $Pb^{++}$ or $Cd^{++}$ ion, or mixtures thereof, which is added to the oxyanionic electrolyte is added to the fused salt electrolyte in the form of a salt containing such ion, which is soluble in the electrolyte, such as a nitrate or perchlorate salt, and diffuses in the electrolyte. The cathode materials in the form of salts such as $In(NO_3)_3$, $Pb(NO_3)_2$, $Cd(NO_3)_2$ or the corresponding perchlorates, e.g. $Pb(ClO_4)_2$, can be added directly to the fused salt electrolyte such as $LiNO_3$, $KNO_3$ or $LiCl0_4$ in concentrations ranging from about $2\times10^{-4}$ to about $2\times10^{-1}$ m(molal). The cathodic current increases directly with increase in concentration.

The electrochemical cells of the present invention can employ various oxyanionic electrolyte salts such as nitrite, nitrate, chlorate, sulfate and sulfite salts. The preferred electrolyte salts are nitrate, nitrite and perchlorate salts, and combintations or mixtures thereof. Specific examples of such electrolyte salts are $LiNO_3/KNO_3$ (42–58 mole %), $LiClO_4/KClO_4$ (72–28 mole %), $NaNO_3/KNO_3$ (50—50 mole %), and $NaNO_2/KNO_3/NaNO_3$ (25-50-25 mole %).

The cathode materials such as $Pb(NO_3)_2$ are added to the fused salt electrolyte, e.g. $NaNO_3/KNO_3$, at a temperature of about 250° C. The cathodic current increases directly with increases in the above range of concentrations. The performance of the cathode materials varies in different electrolyte melts and at different temperatures. Thus, for example, in the nitrate electrolyte melts, $In^{+++}$ performs better than $Pb^{++}$, and the latter performs about equally as well as $Cd^{++}$. In the perchlorate electrolyte melts the $Pb^{++}$ cathode material performs better than the $In^{+++}$ cathode material.

Although applicant is not certain as to the particular theory of operation of the above cathodic materials in the above-described electrolytes, the increase in the cell potential obtained employing the cathode materials of the invention is believed achievable because there is no reversible reduction of the metal ions of the cathode materials to the free metal as in the case of the silver salts. Instead, the metal salt cathode materials of the present invention combine with the above described oxyanionic electrolyte melts to form oxyanionic complexes of metal ions which are reduced in irreversible cathodic reactions. The presence of the metal ion, that is, $Cd^{++}$, $Pb^{++}$ or $In^{+++}$, in the complex significantly improve the kinetics for the reduction of the oxyanion, as shown by the following reaction:

$$(MONO_2)^{+}+2e^{-}\rightarrow MO+NO^{-}$$

where M is the divalent cation Pb or Cd.

A similar reaction occurs to form a complex where M is the trivalent cation In, as follows:

$$(InONO_2)^{++}+2e^{-}\rightarrow InO^{+}+NO_2^{-}$$

The metal salts comprising the cathode material according to the invention, can be employed in electrochemical cells having Li or Ca anodes because the metal ion of the cathode material is not reduced to the free metal, as noted in the above reaction. This prevents any metal film from forming on the anode surface. Instead, the oxyanionic complex of the metal ions of the cathode material, is reduced to the metal oxide, as shown in the above reactions. The metal oxide of the metals used as cathode material in the present invention are usually soluble in the electrolyte melt and diffuse therein and do not passivate the cell electrodes, and the cathode materials hereof can accordingly be allowed to mix with the electrolyte throughout the entire cell.

The metal salts of which the cathode materials are comprised can be used in conjunction with other cathodic materials such as silver salts, e.g. $AgNO_3$, that undergo reduction to silver metal. Under these circumstances, a small concentration of silver salt not to exceed the concentration of the metal salt cathode material hereof should be employed, e.g. a proportion of about 0.01 to about 1 mole of silver salt per mole of the metal salt cathode material, and it is essential that the silver ion be kept near the cathode or cathode collector, so it does not plate out on the anode.

In the electrochemical cell of the present invention, the oxyanionic electrolyte containing the metal salt cathode material hereof is disposed between a lithium or calcium anode and a cathode collector in the nature of a metal current collector such as a nickel screen, with electrical connections to the anode and the cathode current collector. However, if desired, the metal salt cathode material hereof can be used as a solid cathode layer in the electrolyte in solid form, spaced from the anode, and adjacent to the cathode current collector, instead of being added directly to the electrolyte melt.

According to a preferred embodiment of the invention, providing a thermal battery cell with a lithium anode, a nickel screen cathode current collector spaced from the anode, and a $LiNO_3/KNO_3$ electrolyte containing $Pb(NO_3)_2$ cathode material in a concentration of 0.02 m with respect to the electrolyte, the electrolyte can be provided as one or more discs such as of fiberglass filter paper, with the electrolyte containing the cathodic material absorbed thereon. Such electrolyte discs can be prepared by dipping the discs into the molten $LiNO_3/KNO_3$ electrolyte having the lead nitrate cathode material diffused therein, removing the so-treated discs and allowing the electrolyte to solidify. The treated fiberglas discs are then placed with their flat surfaces adjacent each other and sandwiched between the anode and cathode to form the cell as described above.

Operations of the thermal cell according to the invention can be carried cut within a temperature range of about 150° to 350° C., with a preferred range of about 150° to about 250° C.

The increase in cell potential by practice of the invention has been observed in nitrate, nitrite, and perchlorate melts over a broad range of temperatures from 150° C. to 350° C. The table below lists oxyanionic electrolyte melts, metal cathode salts, and temperatures in which positive effects of adding metal salts for increasing cell potential have been observed.

TABLE

| Electrolyte Melt | Cathode Salt | Temperature °C. |
|---|---|---|
| $LiNO_3/KNO_3$ | $Cd(NO_3)_2$ | 350 |
| $LiNO_3/KNO_3$ | $Cd(NO_3)_2$ | 180 |
| $LiNO_3/KNO_3$ | $In(NO_3)_2$ | 180 |
| $LiNO_3/KNO_3$ | $Pb(NO_3)_2$ | 160 |
| $LiClO_4/KClO_4$ | $In(NO_3)_3$ | 250 |
| $LiClO_4/KClO_4$ | $Pb(ClO_4)_2$ | 250 |
| $NaNO_3/KNO_3$ | $Pb(NO_3)_2$ | 250 |
| $NaNO_3/KNO_3$ | $Cd(NO_3)_2$ | 250 |
| $NaNO_2/KNO_3/NaNO_3$ | $Cd(NO_3)_2$ | 250 |

The following are examples of practice of the invention:

EXAMPLE 1

In $(NO_3)_3$ as Cathode Material

Cycle voltammetric studies at 50 mV/s (millivolts per second) of 0.02 m $In(NO_3)_3$ dissolved in a $LiNO_3/KNO_3$ electrolyte (0.58 mole fraction $KNO_3$, mp=124° C.) at 180° C. show a new cathodic wave beginning at 0.0V (vs $Ag^{+}/Ag$). These results indicate that a thermally activated electrochemical cell having a lithium anode, a $LiNO_3/KNO_3$ electrolyte, and containing 0.02 m $In(NO_3)_3$ would yield an open-circuit potential (Eoc) of 3.4 V. A current density of 3 mA/cm$^2$ can be achieved for 0.02 m $In(NO_3)_3$. A cell potential of 2.7 V can be achieved at 15 mA/cm$^2$ for 0.1 m $In(NO_3)_3$.

Similar studies in a $LiClO_4/KClO_4$ melt (0.285 mole fraction $KClO_4$, mp=210° C.) indicate that a thermally activated cell having a lithium anode and containing 0.02 m $In(NO_3)_3$ will yield Eoc=3.0 V at 250° C. A current density of 80 mA/cm$^2$ can be achieved with 0.1 m $In(NO_3)_3$ in $LiClO_4/KClO_4$ at 250° C. at a cell potential of 2.4 V.

EXAMPLE 2

$Cd(NO_3)_2$ as Cathode Material

From cyclic voltammetric studies similar to Example 1, a new cathode wave begins at −0.6 V (vs. $Ag^+/Ag$) at 180° C. in $LiNO_3/KNO_3$ and at 0.0 V (vs $Ag^+/Ag$) at 350° C. in the same melt, with 0.02 m $Cd(NO_3)_2$ added in each case. Therefore, a thermally activated cell constructed with a lithium anode, a $LiNO_3/KNO_3$ electrolyte, and 0.02 m $Cd(NO_3)_2$ will have Eoc=2.8 V at 180° C. and Eoc=3.4 V at 350° C. For 0.1 m $Cd(NO_3)_2$ at 350° .C these studies indicate a cell voltage of 3.0 V at a current density of 50 mA/cm$^2$.

EXAMPLE 3

$Pb(NO_3)_2$ as Cathode Material

From cyclic voltammetric studies at 160° C. similar to Example 1, a new cathodic wave begins at −0.2 V (vs. $Ag^+/Ag$) in $LiNO_3/KNO_3$ with 0.03 m $Pb(NO_3)_2$ added. Therefore, a thermally activated cell with a lithium anode, a $LiNO_3/KNO_3$ electrolyte, and 0.03 m $Pb(NO_3)_2$ added would have Eoc=3.2 V at 160° C. For 0.1 m $Pb(NO_3)_2$ at 160° C., these studies indicate a cell voltage of 2.4 V at a current density of 90 mA/cm$^2$.

EXAMPLE 4

$Pb(ClO_4)_2$ as Cathode Material

From cyclid voltammetric studies at 250° C. in $LiClO_4/KClO_4$ similar to Example 1, a new cathodic wave begins at 0.6 V (vs. $Ag^+/Ag$) with 0.02 m $Pb(ClO_4)_2$ added. Therefore, a thermally activated cell constructed with a lithium anode, a $LiClO_4/KClO_4$ electrolyte, and 0.02 m $Pb(ClO_4)_2$ as the cathode material would have Eoc=4.0 V at 250° C. For 0.1 m $Pb(ClO_4)_2$ at 250° C., a cell voltage of 3.0 V is indicated at 50 mA/cm$^2$.

The present invention has the novel feature of producing cathodic currents at potentials significantly more positive than the potential of the reversible metal ion/metal electrode reactions or the potential observed for the irreversible reduction of uncomplexed oxyanions, thereby producing greater cell potentials than could be previously achieved.

The effects of increased cell potential have been observed using the cathode materials of the invention in nitrate, nitrite, perchlorate and other oxyanionic melts over a broad range of temperature and the cathode metal salts can be used at various concentrations by adding them directly to the electrolyte melt. The use of the cathode materials of the invention does not interfere with the lithium or calcium anodes employed. As previously noted, the use of the cathodic materials of the invention can be practiced in conjunction with other cathodic materials such as silver salts, which undergo reduction to the free metal.

Since various changes and modifications can be made in the invention without departing from the spirit of the invention, the invention is not to be taken as limited except by the scope of the appended claims.

What is claimed is:

1. A thermal electrochemical cell comprising an oxyanionic electrolyte which is a non-conductive solid at ambient temperature and is capable of becoming an ionically conductive liquid upon being heated above its melting point, a cathode material in said electrolyte, said cathode material comprising a metal ion selected from the group consisting $In^{+++}$, $Pb^{++}$ and $Cd^{++}$ ions, and mixtures thereof, and an anode in contact with said electrolyte, selected from the group consisting of Li and Ca anodes.

2. The thermal cell of claim 1, said oxyanionic electrolyte being selected from the group consisting of nitrite, nitrate, chlorate, sulfate and sulfite salts.

3. The thermal cell of claim 1, said oxyanionic electrolyte selected from the group consisting of nitrate, nitrite and perchlorate salts, and mixtures thereof.

4. The thermal cell of claim 3, said oxyanionic electrolyte selected from the group consisting of $LiNO_3/KNO_3$, $LiClO_4/KClO_4$, $NaNO_3/KNO_3$ and $NaNO_2/KNO_3/NaNO_3$.

5. The thermal cell of claim 1, wherein said cathode material is derived from a salt containing said metal ion, said salt being soluble in said electrolyte.

6. The thermal cell of claim 5, wherein said cathode material is selected from the group consisting of $In(NO_3)_3$, $Pb(NO_3)_2$, $Cd(NO_3)_2$ and $Pb(ClO_4)_2$.

7. The thermal cell of claim 5, wherein the concentration of said cathode material in said electrolyte ranges from about $2\times10^{-4}$ to about $2\times10^{-1}$ molal.

8. The thermal cell of claim 5, and including a cathode current collector in contact with said electrolyte and spaced from said anode.

9. The thermal cell of claim 5, said metal salt cathode material comprising a solid layer in said electrolyte spaced from said anode.

10. The thermal cell of claim 5, said cathode material also including a silver salt in a proportion of about 0.01 to about 1 mole per mole of said salt containing said metal ion.

11. The thermal cell of claim 6, wherein said electrolyte is a nitrate electrolyte.

12. The thermal cell of claim 11, wherein said electrolyte is $LiNO_3/KNO_3$, and wherein the concentration of said cathode material is said electrolyte ranges from about $2\times10^{-4}$ to about $2\times10^{-1}$ molal.

13. The thermal cell of claim 6, wherein said electrolyte is a perchlorate electrolyte.

14. The thermal cell of claim 13, wherein said electrolyte is $LiClO_4/KClO_4$, and wherein the concentration of said cathode material in said electrolyte ranges from about $2\times10^{-4}$ to about $2\times10^{-1}$ molal.

15. In a thermal electrochemical cell comprising an anode, a cathode and an electrolyte disposed between said anode and said cathode, an oxyanionic electrolyte which is a non-conductive solid at ambient temperature and is capable of becoming an ionically conductive liquid upon being heated above its melting point, a cathode material diffused in said electrolyte, said cathode material comprising a metal ion selected from the group consisting of $In^{+++}$, $Pb^{++}$ and $Cd^{++}$ ions, and mixtures thereof, and an anode in contact with said electrolyte, and selected from the group consisting of Li and Ca anodes.

16. The thermal cell of claim 15, said oxyanionic electrolyte selected from the group consisting of $LiNO_3/KNO_3$, $LiClO_4/KClO_4$, $NaNO_3/KNO_3$ and $NaNO_2/KNO_3/NaNO_3$.

17. The thermal cell of claim 16, wherein said cathode material is selected from the group consisting of $In(NO_3)_3$, $Pb(NO_3)_2$, $Cd(NO_3)_2$ and $Pb(ClO_4)_2$.

18. The thermal cell of claim 17, wherein the concentration of said cathode material in said electrolyte ranges from about $2\times10^{-4}$ to about $2\times10^{-1}$ molal.

19. The thermal cell of claim 18, and including a cathode current collector in contact with said electrolyte and spaced from said anode.

* * * * *